United States Patent [19]

Penney

[11] Patent Number: 4,587,551
[45] Date of Patent: May 6, 1986

[54] MEASUREMENT OF SC/H PHASE

[75] Inventor: Bruce J. Penney, Portland, Oreg.

[73] Assignee: Tektronix, Inc., Beaverton, Oreg.

[21] Appl. No.: 602,858

[22] Filed: Apr. 23, 1984

[51] Int. Cl.$^4$ ............................................. H04N 17/02
[52] U.S. Cl. ........................................................ 358/10
[58] Field of Search ................................... 358/10, 19

[56] References Cited

U.S. PATENT DOCUMENTS

| | | | |
|---|---|---|---|
| 3,958,269 | 5/1976 | Davis | 358/10 |
| 4,024,571 | 5/1977 | Dischort et al. | 358/19 |
| 4,180,829 | 12/1979 | Pires | 358/10 |
| 4,388,637 | 6/1983 | Blair | 358/10 |
| 4,454,530 | 6/1984 | Yoshinaka et al. | 358/10 |
| 4,470,064 | 9/1984 | Michener | 358/10 |

FOREIGN PATENT DOCUMENTS 2921969 12/1980 Fed. Rep. of Germany ........ 358/10

Primary Examiner—John W. Shepperd
Attorney, Agent, or Firm—John Smith-Hill

[57] ABSTRACT

An instrument for use in indicating SC/H phase of a composite video signal comprises a display device for providing a polar display. A device generates a first input signal for the display device from the reference subcarrier burst of the video signal so as to cause the display device to display an indication at a predetermined angular position of the polar display. The time difference between the sync point and that zero crossing of the extended subcarrier wave which is closest to the sync point is determined, and is used to generate a second input signal for the display device such as to cause the display device to display an indication at a position of the polar display that is angularly spaced from a predetermined axis of the polar display by an angle given by the fraction having as its denominator the period of the reference subcarrier wave and as is numerator the product of the time difference and 360°.

5 Claims, 10 Drawing Figures

MEASUREMENT OF SC/H PHASE

This invention relates to the measurement of SC/H phase.

BACKGROUND OF THE INVENTION

It is well known that the composite color video signals that are conventionally broadcast, for example in the NTSC format, contain not only picture information (luminance and chrominance components) but also timing information (vertical sync pulses and horizontal sync pulses) and other reference information (e.g. equalizing pulses and color burst). As shown in FIG. 1, the horizontal sync pulse 2 and burst 4 both occur in the horizontal blanking interval, i.e., the interval between the active line times of consecutive horizontal scan lines. The horizontal sync pulse is a negative-going pulse having an amplitude of 40 IRE units, the 50 percent point 6 of the leading edge of the sync pulse being regarded as the horizontal sync point. Burst follows the horizontal sync pulse in the horizontal blanking interval and comprises a sinusoidal wave. The peak-to-peak amplitude of the burst is 40 IRE units, and immediately before and after the burst the signal is at blanking level (zero IRE). The burst ideally has a sin-squared envelope, and builds up from, and decays to, blanking level within one or two cycles of the burst wave. In accordance with EIA (Electronics Industries Association) standard RS 170 A, the start of burst is defined by the zero-crossing (positive or negative slope) that precedes the first half cycle of subcarrier that is 50 percent or greater of the burst amplitude, i.e., 40 IRE. The reference subcarrier burst is used in the television receiver to control a phase-locked oscillator which generates a continuous wave at subcarrier frequency and is used to extract the chrominance information from the composite video signal.

Although the NTSC frame is made up of 525 lines which are scanned in two interlaced fields of 262.5 lines each, the NTSC color signal requires a four field sequence. In accordance with the definitions of the fields contained in standard RS 170 A, the zero crossing of the extrapolated color burst (the continuous wave at subcarrier frequency and in phase with burst) must be coincident with the sync point of the immediately preceding horizontal sync pulse on even numbered lines, and the pattern of sync and burst information for fields 1 and 3 is identical except for the phase of burst. Thus, in field 1, the positive-going zero crossing of the extrapolated color burst coincides with the sync point on even numbered lines whereas in field 3 it is the negative-going zero crossing that coincides with the sync point on even numbered lines. Standards such as that set forth in RS 170 A are required in order to facilitate matching between video signals from different sources and also to facilitate operation of video signal recording and processing equipment. Accordingly, in order to identify the different fields of the four field color sequence, and to adjust the subcarrier to horizontal sync (SC/H) phase so as to achieve the desired coincidence between the zero crossing point of the extrapolated color burst and the sync point, it is necessary to be able to measure the phase of the subcarrier burst relative to the sync point.

Several attempts have previously been made to measure SC/H phase. For example, using the Tektronix 1410 signal generator, it is possible to generate a subcarrier in the middle of an unused line. Since the leading edge of the equalizing pulses are midway between sync pulses, a measurement of subcarrier to horizontal phase can be implied by comparing the subcarrier with the equalizing pulse timing. Alternatively the 1410 signal generator can generate a burst phased subcarrier during horizontal blanking which replaces a sync pulse and which can be compared with the remaining sync pulses. However, this equipment is not always available to technicians who need to make SC/H phase measurements. The GVG 3258 SC/H phase meter provides a digital output of the phase difference between subcarrier and horizontal sync, but this again requires availability of dedicated equipment.

The vectorscope, which provides a polar display of the phase of signal components at subcarrier frequency, is commonly used by video engineers and technicians, but the conventional vectorscope cannot be used to measure SC/H phase.

SUMMARY OF THE INVENTION

According to the present invention there is provided an instrument for use in indicating SC/H phase of a composite video signal, comprising a display device for providing a polar display, a device for generating from the reference subcarrier burst of the video signal a first input signal for the display device such as to cause the display device to display an indication at a predetermined angular position of the polar display, phase determining and indicating means for determining the time difference between the sync point and that zero crossing of the extended subcarrier wave which is closest to the sync point and for generating from said time difference a second input signal for the display device such as to cause the display device to display an indication at a position of the polar display that is angularly spaced from a predetermined axis of the polar display by an angle given by the fraction having as its denominator the period of the reference subcarrier wave and as its numerator the product of said time difference and 360°.

The present invention may be used to enable a vectorscope to provide an indication of SC/H phase. In the conventional vectorscope, the reference subcarrier burst is indicated by a vector on the 180° radius (−x direction in Cartesian coordinates). In accordance with the present invention, the time difference between the sync point and the closest zero crossing of the extended subcarrier wave is determined and the time difference is converted to an angular measure within the subcarrier wave cycle. The vectorscope can then be used to display an indication in accordance with the angle corresponding to the time difference, preferably in the form of a dot. In the event that the datum radius from which the angle is measured is the 180° radius, the dot is aligned with the subcarrier vector when the subcarrier is in phase with horizontal sync. Thus, the present invention enables a vectorscope to be used to provide an indication of SC/H phase.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
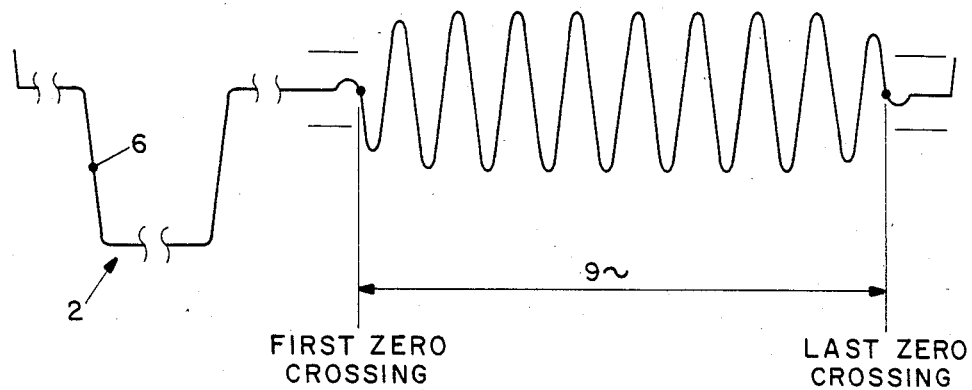
FIG. 1 illustrates diagrammatically the waveform of the NTSC video signal during the horizontal blanking inverval.
Figure 2:
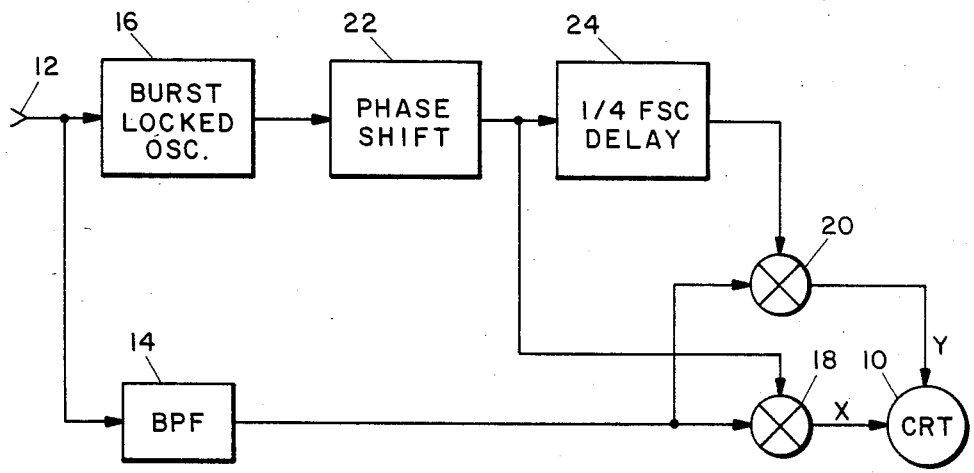
FIG. 2 illustrates in block form the major components of a conventional vectorscope for use in the NTSC system.

FIG. 2 of the drawings illustrates in block form the major components of a conventional vectorscope having a CRT 10. The composite video input signal is applied by way of an input terminal 12 to both a 3.58 MHz bandpass filter 14 and a burst locked oscillator 16. The burst locked oscillator 16 generates a continuous wave signal at subcarrier frequency (3.58 MHz) phased locked to burst. The bandpass filter 14 passes components of the composite video signal that have a frequency of 3.58 MHz, i.e., burst and the color components present during the active line time of the video signal. The output signal from the filter 14 is applied to two demodulators 18 and 20, which may simply be multipliers. The output of the oscillator 16 is applied through a variable phase shifter 22 directly to the demodulator 18 and to the demodulator 20 through a quarter period (of subcarrier frequency) delay 24. The output of the demodulator 18 is applied to the X-deflection plates of the CRT 10. The output of the demodulator 20 is applied to the Y-deflection plates of the CRT. It will thus be understood that the vectorscope provides a display in polar coordinates of the amplitude and phase relative to burst of each of the color components present in the composite video signal. By using the phase shifter 22 to align the vector representing burst with a predetermined axis of the display, usually the −X axis, a technician can determine whether the subcarrier components present in a test signal comply with prescribed standards. However, the conventional vectorscope display yields no information concerning SC/H phase.

Figure 3:
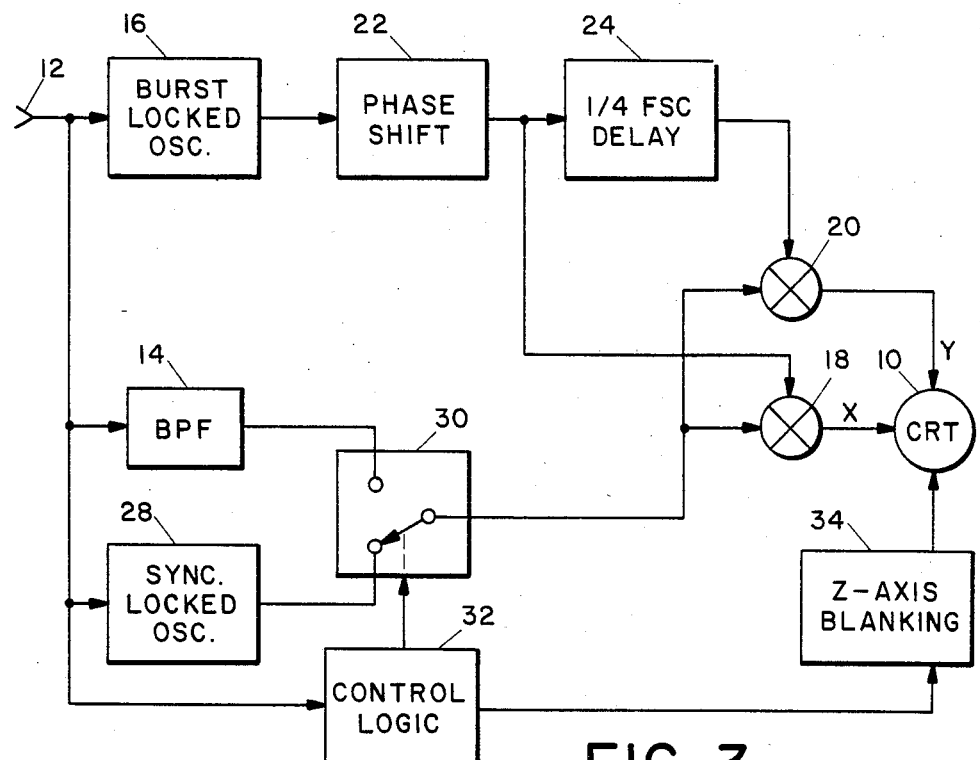
FIG. 3 illustrates in block form a vectorscope embodying the present invention, adapted for use in the NTSC system.

In the case of the vectorscope shown in FIG. 3, the composite video signal is also used to generate a signal representative of SC/H phase.

Figure 4:
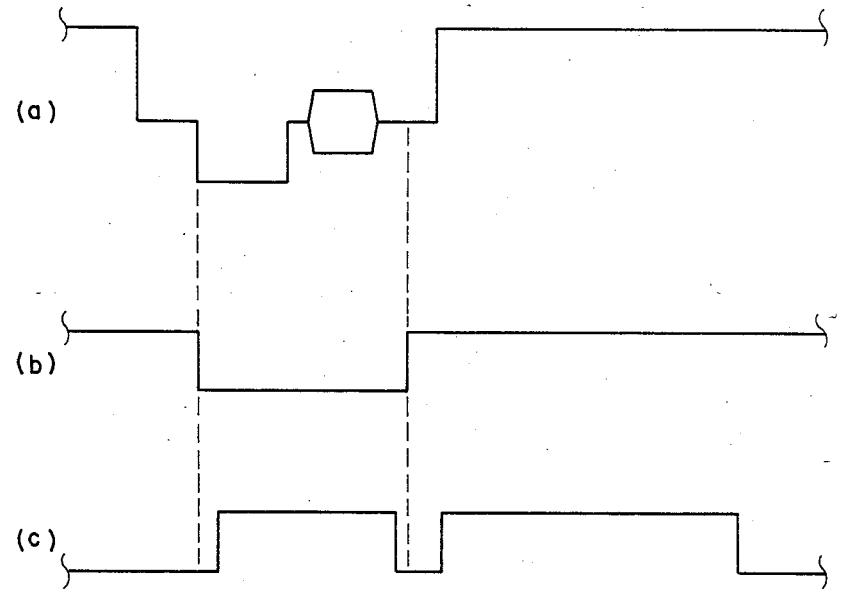
FIG. 4 illustrates waveforms useful in understanding operation of the FIG. 3 vectorscope.
Figure 5:
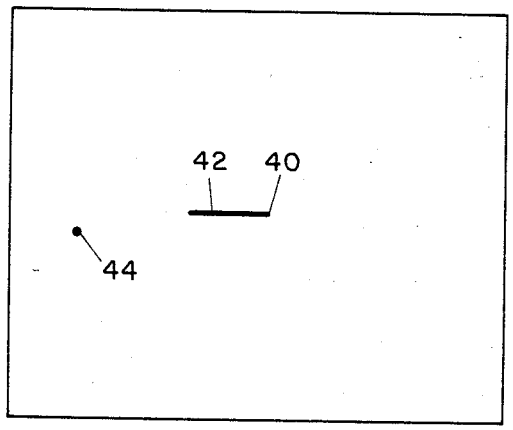
FIG. 5 illustrates the display provided by the FIG. 3 vectorscope.

As shown in FIG. 3, the composite video signal is applied to a phase locked oscillator 28 which generates a continuous wave 3.58 MHz signal, phase-locked to sync, i.e., a positive-going zero crossing of the continuous wave signal coincides with the sync point. This sync locked CW signal and the output of the chroma filter 14 are applied to a switch 30, which is controlled by a contol logic circuit 32. The circuit 32 controls not only selection between the filter 14 and the oscillator 28 but also Z-axis blanking of the CRT 10 by a blanking circuit 34. The manner of operation of the circuit 32 when the vectorscope is in SC/H phase display mode is indicated in FIG. 4, in which the waveform (a) represents the composite video signal, the waveform (b) represents the state of the switch 30 and the waveform (c) represents the state of the blanking circuit 34. When the vectorscope is in its normal display mode, the control logic 32 causes the switch 30 to select continuously the filter 14, and the vectorscope functions in the manner described with reference to FIG. 2. When the vectorscope is operating in its SC/H phase display mode, the control logic 32 causes the switch to select the output of the filter 14 (waveform (b) low) only during sync and burst time, and to select the sync locked CW (waveform (b) high) during the remainder of the line time. The control logic 32 also controls the Z-axis blanking circuit 34 to blank the CRT 10 (waveform (c) low) during the switches between the filter 34 and the oscillator 28 and to unblank the CRT (waveform (c) high) for a portion of the time for which the filter 14 is selected, so as to provide the center dot 40 and burst vector 42 on the display. The CRT is also unblanked for a portion of the active line time, during which the sync locked CW is selected, on even numbered lines to display a vector representing the phase and amplitude of the sync locked CW on those lines. The duration of the latter unblanking is variable to control the intensity of the display of the sync locked CW vector relative to the burst vector and center dot. Preferably, the unblanking time is chosen so that only the outer extremity of the sync locked CW vector is visible, and therefore the sync locked CW vector is indicated by a dot 44. The amplitude of the sync locked CW is greater than that of burst, and therefore the sync locked CW vector extends beyond the burst vector and the dot 44 indicating sync locked CW is visually distinguishable from the burst vector even when it is disposed at the same angular position of the polar display.

It will be understood that the reason for unblanking the CRT during the active line time on even numbered lines only is because the phase of the sync locked CW is reversed on consecutive lines and therefore unblanking the CRT during the active line time of each line would result in display of two sync locked CW vectors, with possible difficulty in distinguishing the sync locked CW vector on even numbered lines from that on odd numbered lines. An alternative way of avoiding this problem would be to reverse the phase of the sync locked CW on consecutive lines, e.g., by switching in a half-period delay.

Figure 6:
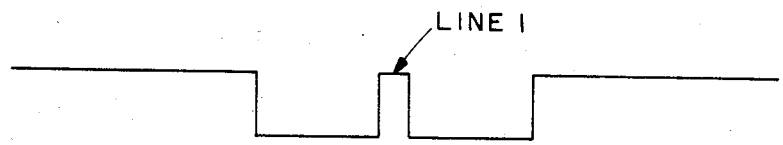
FIG. 6 illustrates a waveform useful in understanding operation of a vectorscope embodying the invention, adapted for use in the PAL system.
Figure 7:
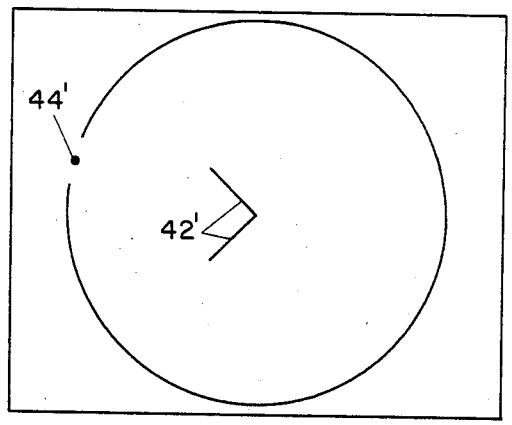
FIG. 7 illustrates the display provided by a vectorscope embodying the invention, adapted for use in the PAL system.

A vectorscope embodying the invention and adapted for use in the PAL system comprises essentially the same functional elements as are shown in FIG. 3. However, in order to accommodate the 25 Hz offset that exists between burst and sync in the PAL system, the controls performed by the control logic 32 are somewhat different. Thus, if the control logic 32 carried out only the controls indicated by the waveforms shown in FIG. 4, the sync dot would describe a complete circle, because SC/H phase is different for every line of each field. In accordance with the PAL standard, SC/H phase is defined on line 1. In the vectorscope embodying the invention, the control logic 32 is used to blank the sync dot for a few lines before and after line 1, as indicated in FIG. 6. The resulting display is shown in FIG. 7, and it will be seen that the part circle formed by unblanked sync dot on either side of the blanked portions aid in locating the dot 44' representing the sync locked CW vector for line 1. The resulting gaps in the circle form a coarse display of SC/H phase which is usable from a distance. For reasons that are well understood by persons skilled in the art, two burst vectors 42' are shown in FIG. 7.

Figure 8:
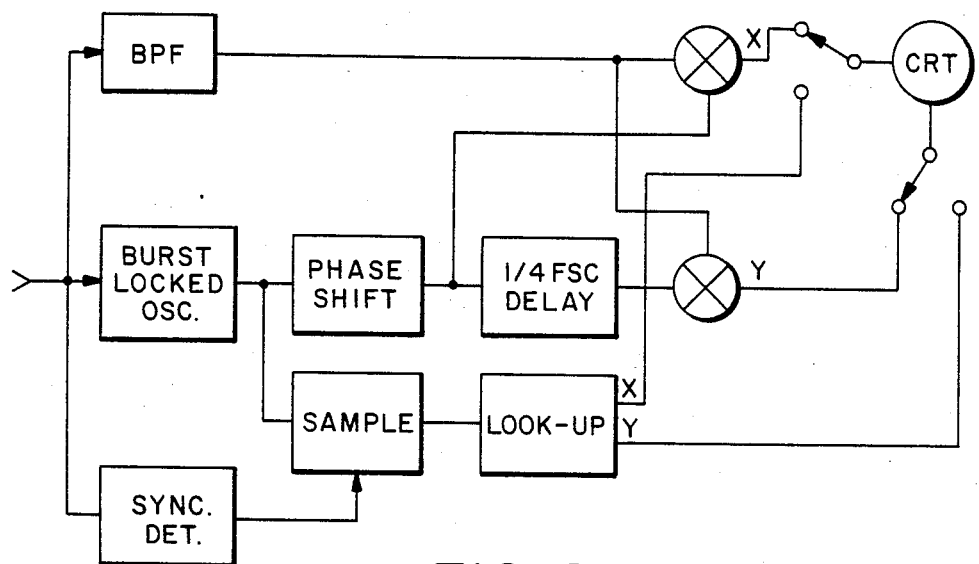
FIGS. 8, 9 and 10 illustrate in block form additional embodiments of the invention.
Figure 9:
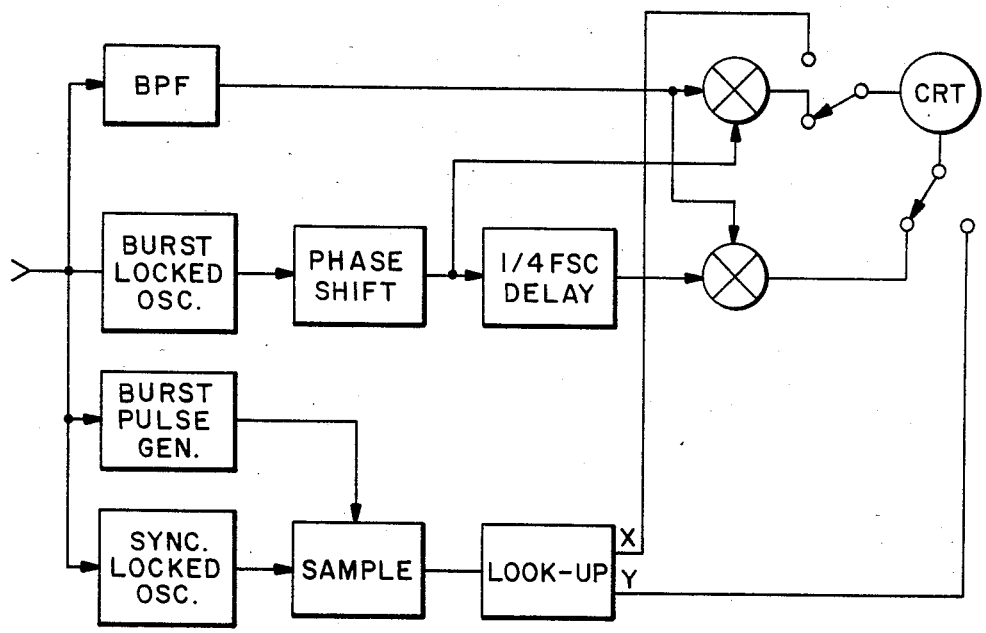
Figure 10:
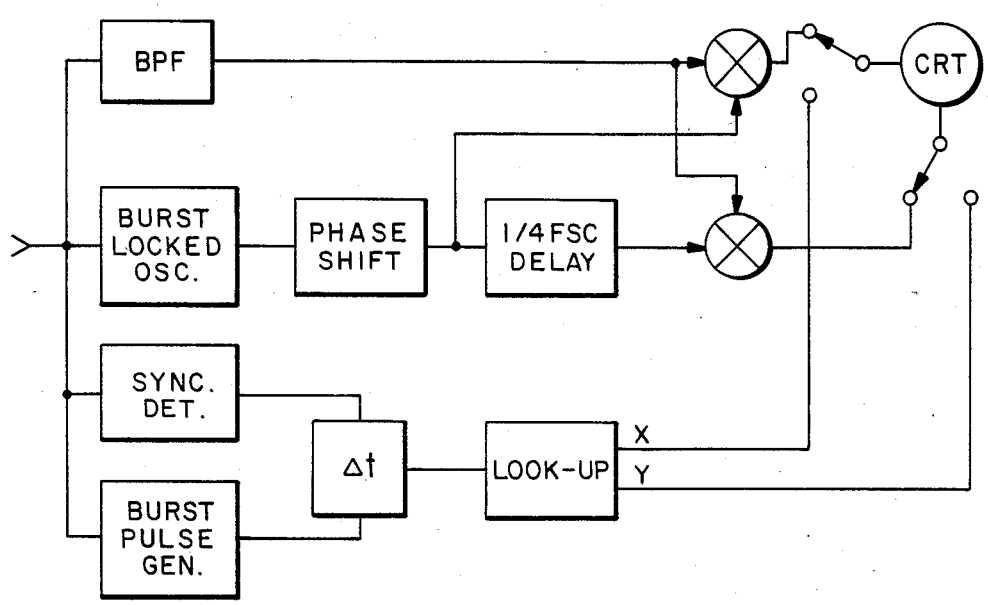

It will be appreciated that the invention is not restricted to the particular instrument that has been described with reference to FIG. 3, since variations may be made therein without departing from the scope of the invention as defined in the appended claims, and equivalents thereof. For example whereas in the case of FIG. 3 the measure of sync timing relative to burst is obtained by generating the sync locked CW, and this CW signal is used directly as an input to the vectorscope and is processed through the vectorscope's conventional functional elements to provide the desired display, other means of generating a signal representative of the phase angle corresponding to the time difference between the sync point and the closest zero crossing of the extended subcarrier wave may be used. For example, as shown in FIG. 8 it would be possible to use a sync detector to generate a signal at the sync point and to use this signal to sample the extended subcarrier wave. The amplitude of the extended subcarrier wave at the sample point is dependent upon SC/H phase, and may be used to generate signals for application to the X and Y plates of the CRT. Alternatively, a sampling pulse may be generated at the first positive-going zero crossing point of burst, and this pulse may be used to sample a sync locked continuous wave (FIG. 9). Again, the amplitude of the wave at the sample point is representative of the SC/H phase. Still further, a sync detector could be used to generate a first pulse and the next positive-going zero crossing point of the burst could be used to generate a second pulse, and a simple time measuring circuit could be used to determine the delay between the pulses (FIG. 10). This time difference could be translated into a measure of SC/H phase. In addition, if it were desired to compare two video signals, e.g., an input signal and a reference signal for color framing purposes, the vectorscope could be constructed with two sync locked oscillators fed by the two signals respectively. In this case, the outputs of the two oscillators would be applied to the switch 30, which would time multiplex these outputs and the output of the filter into the display to enable comparison of the timing of the sync points of the two video signals to each other and to burst.

I claim:

1. An instrument for use in indicating SC/H phase of a composite video signal, comprising a display device for providing a polar display, a device for generating from the reference subcarrier burst of the video signal a first input signal for the display device such as to cause the display device to display an indication at a predetermined angular position of the polar display, phase determining and indicating means for determining the time difference between the sync point and that zero crossing of the extrapolated subcarrier wave which is closest to the sync point and for generating from said time difference a second input signal for the display device such as to cause the display device to display an indication at a position of the polar display that is angularly spaced from a predetermined axis of the polar display by an angle given by the fraction having as its denominator the period of the reference subcarrier wave and as its numerator the product of said time difference and 360°.

2. An instrument according to claim 1, wherein said instrument comprises a subcarrier regenerator for regenerating from burst a continuous wave signal at subcarrier frequency and phase-locked to burst, and wherein the phase determining and indicating means comprise a sync detector for generating a pulse at the sync point, a sampler for sampling the regenerated subcarrier wave with the pulse generated by the sync detector and providing an output signal representative of the magnitude of the continuous wave at the sync point, and means for converting said output signal into a signal representative of the angular position, within the reference subcarrier cycle, of the sync point.

3. An instrument according to claim 1, wherein the phase determining and indicating means comprise an oscillator for generating a signal at subcarrier frequency and phase-locked to horizontal sync, and means for determining the phase difference between burst and said signal at subcarrier frequency.

4. An instrument according to claim 1, wherein the phase determining and indicating means comprise an oscillator for generating a signal at subcarrier frequency and phase-locked to horizontal sync, means for generating a pulse at a predetermined zero crossing of burst, a sampler for sampling said signal at subcarrier frequency with said sampling pulse and providing an output signal representative of the magnitude of the sampled signal at the sample point, and means for converting said output signal into a signal representative of the angular position, within the reference subcarrier cycle, of the sync point.

5. An instrument according to claim 1, wherein the phase determining and indicating means comprise a first pulse generator for generating a pulse at a predetermined time relative to the sync point, a second pulse generator for generating a pulse at a predetermined time relative to the first positivegoing zero crossing of burst, means for determining the time difference between said pulses, and means for converting said time difference into a signal representative of the angular position, within the reference subcarrier cycle, of the sync point.

* * * * *